United States Patent [19]

Nagai et al.

[11] Patent Number: 5,172,949
[45] Date of Patent: Dec. 22, 1992

[54] SUCTION PAD WITH TEMPERATURE CONTROL MECHANISM

[75] Inventors: Shigekazu Nagai; Shuuzou Sakurai; Tadasu Kawamoto, all of Sohka, Japan

[73] Assignee: SMC Kabushiki Kaisha, Tokyo, Japan

[21] Appl. No.: 739,430

[22] Filed: Aug. 2, 1991

[51] Int. Cl.$^5$ .............................................. B65H 3/08
[52] U.S. Cl. ..................................... 294/64.1; 901/40
[58] Field of Search ............... 294/64.1; 219/526, 528; 269/21; 414/627, 737, 752; 901/40

[56] References Cited

U.S. PATENT DOCUMENTS

| 3,875,373 | 4/1975 | Lowery et al. .................. 219/526 |
| 4,088,312 | 5/1978 | Frosch et al. . |
| 4,528,746 | 7/1985 | Yoshimura .......................... 29/743 |

FOREIGN PATENT DOCUMENTS

| 2535460 | 2/1977 | Fed. Rep. of Germany ..... 294/64.1 |
| 3306999 | 10/1983 | Fed. Rep. of Germany . |
| 3-5117 | 10/1991 | Japan . |
| 660914 | 5/1979 | U.S.S.R. .......................... 294/64.1 |
| 1255546 | 9/1986 | U.S.S.R. .......................... 294/64.1 |
| 1463342 | 2/1977 | United Kingdom . |

Primary Examiner—Charles A. Marmor
Assistant Examiner—Joseph D. Pape
Attorney, Agent, or Firm—Oblon, Spivak, McClelland, Maier & Neustadt

[57] ABSTRACT

A suction pad for attracting a workpiece under vacuum has a cylindrical base to be connected to a vacuum source, and a skirt integrally joined to the base, for developing a vacuum therein to attract the workpiece. The suction pad can be kept at a temperature suitable for the workpiece, by an electric heater which is controlled in response to a temperature signal from a temperature sensor embedded in the skirt. The suction pad with the controlled temperature does not cause problems which would otherwise result from the different temperatures of the suction pad and the workpiece.

13 Claims, 3 Drawing Sheets

SUCTION PAD WITH TEMPERATURE CONTROL MECHANISM

BACKGROUND OF THE INVENTION

1. Field of the Invention

The present invention relates to a suction pad with a temperature control mechanism, for attracting a workpiece under vacuum.

2. Description of the Prior Art

Suction pads, for example, connected to a vacuum source are used to transfer cathode-ray tubes with a fluorescent material coated on the back of the glass screen, workpieces of synthetic resin, or the like. The suction pads are more advantageous than feeders with workpiece gripping mechanisms because the suction pads do not cause damage to the workpieces as they are attracted under vacuum while being transferred by the suction pads.

Generally, the suction pads are used at room temperature for conveying workpieces.

When a workpiece, e.g., a part of a cathode-ray tube with a fluorescent screen, is to be transferred under vacuum by a suction pad, the fluorescent coating on the screen may be peeled off because of the different temperatures of the workpiece and the suction pad. The difference between the temperatures of a suction pad and a workpiece of synthetic resin is liable to cause the suction pad to leave a pad mark, e.g., a circular pad mark, on the workpiece of synthetic resin while the workpiece is being conveyed by the suction pad, resulting in a reduction in the workpiece quality. The different temperatures of a suction pad and a workpiece attracted under vacuum thereby even tend to deform the workpiece.

SUMMARY OF THE INVENTION

It is an object of the present invention to provide a suction pad with a temperature control mechanism comprising an electric heater and a temperature sensor, the electric heater being energizable in response to an output signal from the temperature sensor for eliminating any temperature difference between the suction pad and a workpiece which is attracted under vacuum by the suction pad.

According to the present invention, there is provided a suction pad for attracting a workpiece under vacuum, comprising a base adapted to be connected to a vacuum source, a skirt integrally joined to the base for developing a vacuum therein to attract the workpiece, and a temperature control mechanism including an electric heater disposed on the skirt.

The temperature control mechanism further includes a temperature sensor disposed on ether the base or the skirt.

The electric heater may be detachably mounted on the skirt.

The electric heater may comprise a plurality of electric heater rods extending substantially from the base along the skirt.

The electric heater may be spirally mounted on the skirt.

The temperature control mechanism may further include a thermal insulation, the electric heater being sandwiched between the skirt and the thermal insulation.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
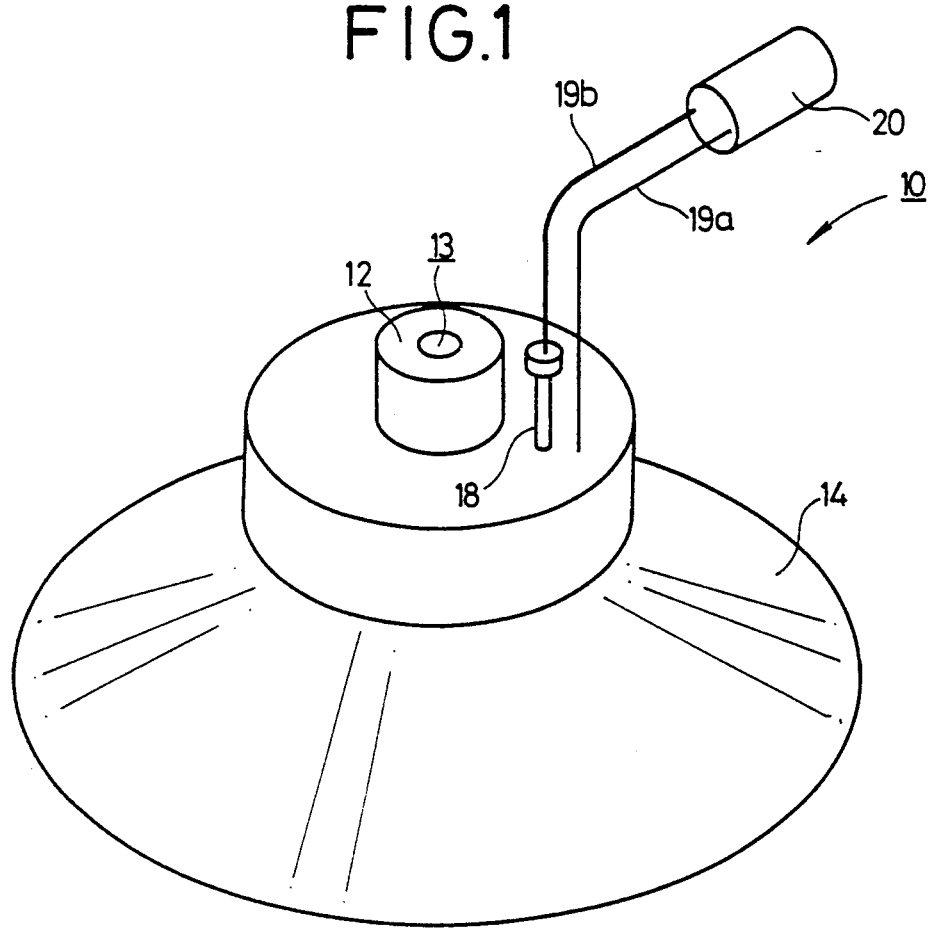
FIG. 1 is a perspective view of a suction pad according to a first embodiment of the present invention.

Like or corresponding parts are denoted by like or corresponding reference characters throughout views.

Figure 2:
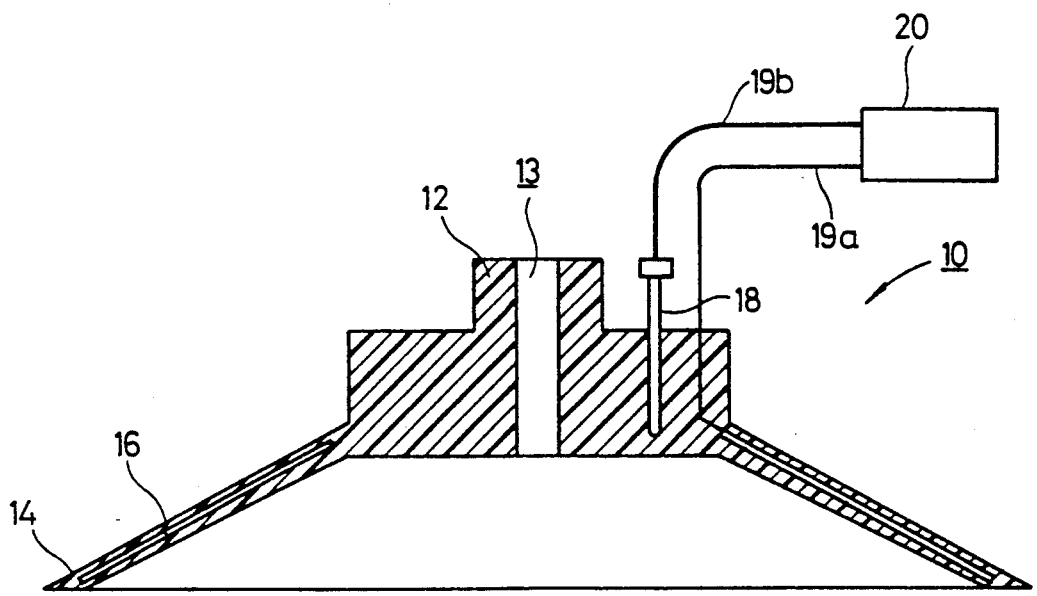
FIG. 2 is a vertical cross-sectional view of the suction pad shown in FIG. 1.

FIGS. 1 and 2 show a suction pad, generally designated by the reference numeral 10, according to a first embodiment of the present invention.

The suction pad 10 comprises a cylindrical base 12 to be connected to a vacuum source (not shown), and a circular skirt 14 integrally joined to an axial end of the cylindrical base 12. The cylindrical base 12 has an axial hole 13 defined centrally therethrough and opening at one end into the skirt 14 so that a vacuum can be developed in the skirt 14 through the hole 13. The suction pad 10 includes an electric heater 16 embedded in the skirt 14, and a temperature sensor 18 mounted on the cylindrical base 12 parallel to the hole 13. The electric heater 16 comprises a plurality of electric heater rods extending substantially from the cylindrical base 12 along the skirt 14 toward an outer circumferential edge thereof. The electric heater 16 and the temperature sensor 18 are connected by respective conductors 19a, 19b to a connector 20, which is connected to a temperature control device (not shown).

The suction pad 10 shown in FIGS. 1 and 2 operates as follows:

The suction pad 10 is mounted on an arm of a workpiece transfer system (not shown), and the hole 13 defined in the cylindrical base 12 is coupled to the non-illustrated vacuum source.

A temperature at which the suction pad 10 is to be kept is determined in relation to a workpiece which is to be attracted under vacuum and transferred by the suction pad 10. A temperature setting unit of the temperature control device is then preset to the determined temperature, and the temperature control device controls the temperature of the suction pad 10 through the electric heater 16. After the temperature of the suction pad 10 has reached the preset temperature, the arm of the workpiece transfer system is actuated to bring the suction pad 10 into contact with the workpiece, and displaced to cause the suction pad 10, which is kept at the preset temperature, to transfer the workpiece while attracting the workpiece under vacuum.

Figure 3:
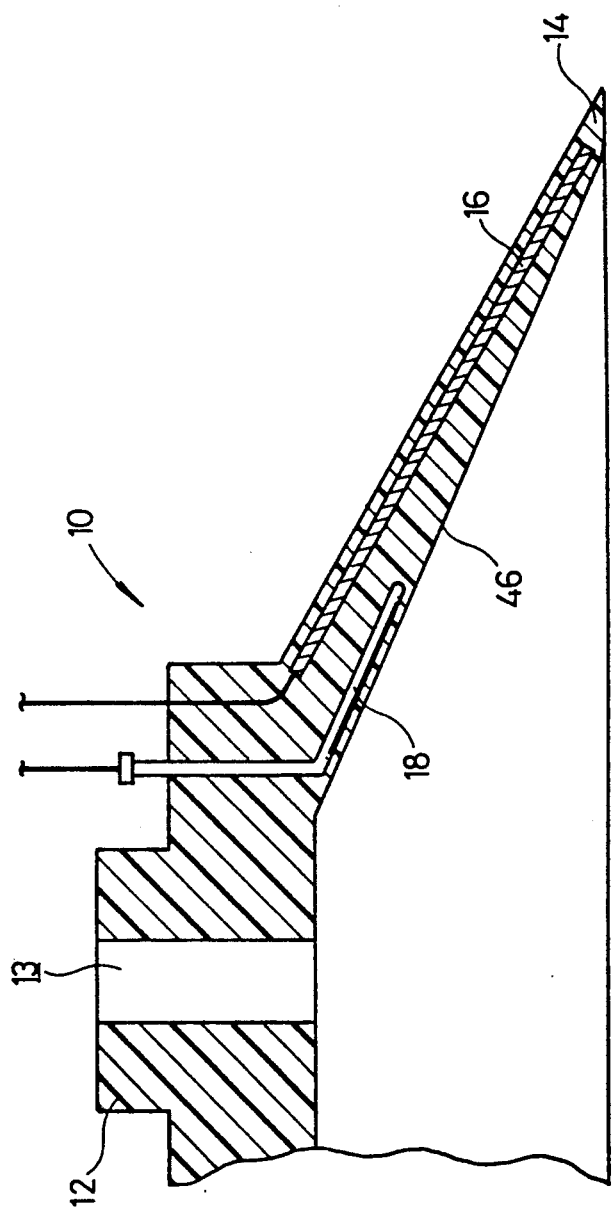
FIG. 3 is an enlarged fragmentary vertical cross-sectional view of a suction pad according to a second embodiment of the present invention.

FIG. 3 shows a suction pad 10 according to a second embodiment of the present invention.

As shown in FIG. 3, the suction pad 10 has a cylindrical base 12 with an axial hole 13 defined therethrough and a skirt 14 integral with the cylindrical base 12. The suction pad 10 also has an electric heater 16 embedded in the skirt 14 near an outer surface thereof, and a thin temperature sensor 18 embedded in the skirt 14 near an inner surface thereof, which serves as a workpiece attracting surface 46. The temperature sensor 18 may comprise a thermocouple, a thermistor, or the like.

The electric heater 16 and the temperature sensor 18 are spaced as far as possible from each other. The temperature sensor 18 is positioned as closely to the workpiece attracting surface 46 as possible, so that the temperature sensor 18 can virtually detect the temperature of the pad surface to which the workpiece can be attracted.

The temperature sensor 18 thus positioned is not strongly affected by the electric heater 16, but can measure the temperature at the workpiece attracting surface 46 of the suction pad 10. Therefore, the temperature sensor 18 can supply the temperature control device with a temperature signal representative of the temperature at the workpiece attracting surface 46. In response to the temperature signal from the temperature sensor 18, the temperature control device controls the electric heater 16 to keep the workpiece attracting surface 46 of the suction pad at a temperature suitable for the workpiece to be transferred by the suction pad 10.

The temperature sensor 18 may be in the form of a thin film applied to the workpiece attracting surface 46.

A suction pad according to a third embodiment of the present invention will now be described below with reference to FIGS. 4 and 5.

Figure 4:
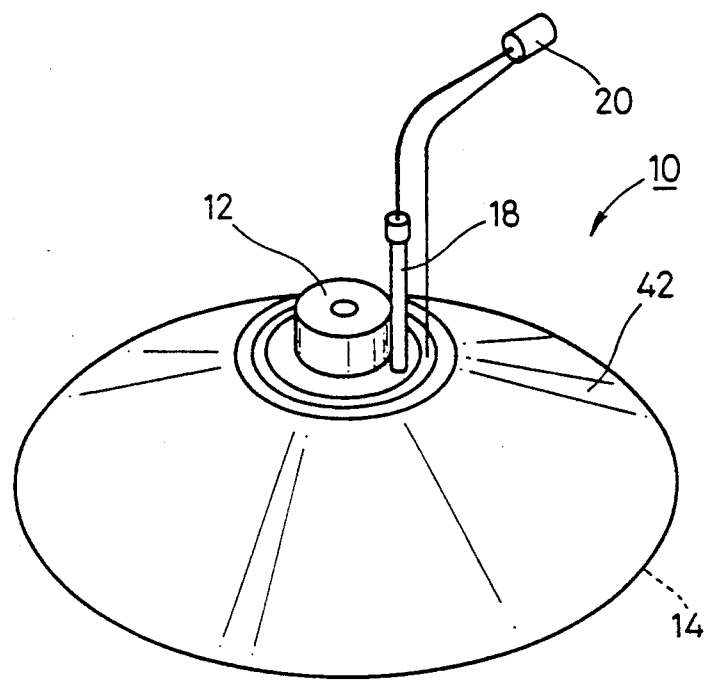
FIG. 4 is a perspective view of a suction pad according to a third embodiment of the present invention.
Figure 5:
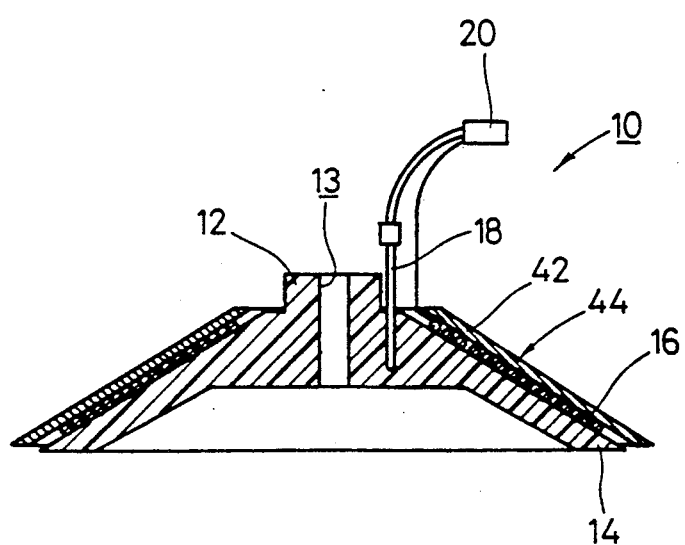
FIG. 5 is a vertical cross-sectional view of the suction pad shown in FIG. 4.

As shown in FIGS. 4 and 5, the suction pad, generally designated also by the reference numeral 10, comprises a cylindrical base 12 with an axial hole 13 defined therethrough and a skirt 14 integral with the cylindrical base 12. A temperature sensor 18 is mounted in the cylindrical base 12 parallel to the hole 13. The suction pad 10 also has an electric heater unit 44 detachably mounted on the skirt 14. The electric heater unit 44 comprises an electric heater 16 and a thermal insulation 42. The thermal insulation 42 is of a frustoconical shape and covers the electric heater 16 which is spirally wound on the outer surface of the skirt 14. The electric heater 16 and the temperature sensor 18 are connected to a connector 20, which is connected to a temperature control device (not shown).

The electric heater unit 44 is replaceable with another electric heater unit of different capacity, and the temperature sensor 18 is also replaceable with another temperature sensor of different temperature range. More specifically, when a workpiece of a different size and a different weight is to be transferred by the suction pad 10, the electric heater unit 44 and the temperature sensor 18 are removed, and a different electric heater unit 44 suitable for the new workpiece and another temperature sensor 18 which matches the different electric heater unit 44 are mounted on the skirt 14. Therefore, the suction pad 10 can handle workpieces of different types simply through replacement of the electric heater unit 44 and the temperature sensor 18.

With the present invention, as described above, it is possible to control the temperature of the suction pad so as to match the workpiece to be transferred by the suction pad. Since the suction pad may be kept at the same temperature as that of the workpiece to be transferred thereby, the suction pad does not cause problems which would otherwise result from the difference between the temperatures of the suction pad and the workpiece. Specifically, the suction pad will not peel off the fluorescent coating on the back of the screen of a cathode-ray tube which is attracted under vacuum and transferred by the suction pad. Furthermore, the suction pad will neither deform nor leave a pad mark on a workpiece of synthetic resin.

Although certain preferred embodiments of the present invention have been shown and described in detail, it should be understood that various changes and modifications may be made therein without departing from the scope of the appended claims. For example, eventhough the electric heater means is disposed in the skirt, a cooling means might be applicable to the skirt instead of the heater means due to characteristics of work.

What is claimed is:

1. A suction pad for attracting a workpiece under vacuum, comprising:
    a base adapted to be connected to a vacuum source;
    a skirt integrally joined to said base and projecting radially outwardly from said base, for developing a vacuum therein to attract the workpiece; and
    a temperature control mechanism including an electric heater disposed in contact with said skirt, said electric heater comprising at least one electric heating element extending substantially from said base along said skirt.

2. A suction pad according to claim 1, wherein said temperature control mechanism further includes a temperature sensor disposed on either said base or said skirt.

3. A suction pad according to claim 1 or 2, wherein said electric heater is detachably mounted on said skirt.

4. A suction pad according to claim 1 or 2, wherein said electric heating element comprises a plurality of electric heater rods extending substantially from said base along said skirt.

5. A suction pad according to claim 1 or 2, wherein said electric heating element is spirally mounted on said skirt and extends from said base along said skirt.

6. A suction pad according to claim 3, wherein said electric heating element is spirally mounted on said skirt and extends from said base along said skirt.

7. A suction pad according to claim 3, wherein said temperature control mechanism further includes a thermal insulation, said electric heater being sandwiched between said skirt and said thermal insulation.

8. A suction pad for attracting a workpiece under vacuum, comprising:
    a base adapted to be connected to a vacuum source;
    a skirt integrally joined to said base, for developing a vacuum therein to attract the workpiece; and
    a temperature control mechanism including an electric heater disposed in contact with said skirt, said electric heater comprising a plurality of electric heater rods extending substantially from said base along said skirt.

9. A suction pad according to claim 8, wherein said temperature control mechanism further includes a temperature sensor disposed on either said base or said skirt.

10. A suction pad according to claim 8, wherein said electric heater rods are embedded in said skirt.

11. A suction pad for attracting a workpiece under vacuum, comprising:
    a base adapted to be connected to a vacuum source;
    a skirt integrally joined to said base, for developing a vacuum therein to attract the workpiece; and
    a temperature control mechanism including an electric heater disposed in contact with said skirt, said electric heater being detachably mounted on said skirt, wherein said temperature control mechanism further includes a thermal insulation, said electric heater being sandwiched between said skirt and said thermal insulation.

12. A suction pad according to claim 11, wherein said temperature control mechanism further includes a temperature sensor disposed on either said base or said skirt.

13. A suction pad according to claim 11, wherein said electric heater is spirally mounted on said skirt.

* * * * *